(12) United States Patent
Hecht et al.

(10) Patent No.: US 9,999,930 B2
(45) Date of Patent: Jun. 19, 2018

(54) HAND-HELD MACHINE TOOL HAVING A STRIKING MECHANISM

(75) Inventors: Joachim Hecht, Magstadt (DE); Martin Kraus, Filderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 740 days.

(21) Appl. No.: 13/805,705

(22) PCT Filed: May 19, 2011

(86) PCT No.: PCT/EP2011/058140
§ 371 (c)(1),
(2), (4) Date: Mar. 12, 2013

(87) PCT Pub. No.: WO2011/160902
PCT Pub. Date: Dec. 29, 2011

(65) Prior Publication Data
US 2013/0161044 A1    Jun. 27, 2013

(30) Foreign Application Priority Data
Jun. 23, 2010 (DE) .................. 10 2010 030 433

(51) Int. Cl.
*B23B 51/12* (2006.01)
*B25F 3/00* (2006.01)
(Continued)

(52) U.S. Cl.
CPC .......... *B23B 31/1238* (2013.01); *B23B 31/12* (2013.01); *B23Q 3/12* (2013.01);
(Continued)

(58) Field of Classification Search
CPC ......... B25B 51/08; B25B 51/12; B23B 31/12; B23B 51/08; B23B 51/12; B25F 3/00; B25D 17/005; B25D 17/088
(Continued)

(56) References Cited

U.S. PATENT DOCUMENTS 3,827,510 A  *  8/1974  Mazepa ................. B23B 31/08
                                                        173/217
4,097,054 A  *  6/1978  Derbyshire .......... B23B 31/102
                                                        279/60
(Continued)

FOREIGN PATENT DOCUMENTS

| CN | 1370657 | 9/2002 |
|---|---|---|
| CN | 1978148 | 6/2007 |

(Continued)

OTHER PUBLICATIONS

International Search Report for PCT/EP2011/058140, dated Aug. 3, 2011.

*Primary Examiner* — Gloria R Weeks
(74) *Attorney, Agent, or Firm* — Norton Rose Fulbright US LLP; Gerard Messina

(57) ABSTRACT

In a hand-held machine tool, having a tool holder for holding at least one first tool, which has a tang having a first coupling contour that is able to be connected to the tool holder and having a striking mechanism for the striking drive of the first tool connected to the tool holder in the axial direction of the tool holder in a striking operation associated with the hand-held machine tool, a chuck adapter is provided to hold at least one second tool, which has a tang provided with a second coupling contour, which is able to be connected to the chuck adapter in a torsionally fixed manner.

26 Claims, 6 Drawing Sheets

(51) Int. Cl.
*B23B 31/12* (2006.01)
*B25D 16/00* (2006.01)
*B23Q 3/12* (2006.01)
*B25D 17/00* (2006.01)
*B25D 17/08* (2006.01)

(52) U.S. Cl.
CPC ........... *B25D 16/00* (2013.01); *B25D 17/005* (2013.01); *B25D 17/088* (2013.01); *B25F 3/00* (2013.01); *B23B 2231/04* (2013.01); *B25D 2217/0042* (2013.01); *Y10T 279/3406* (2015.01)

(58) Field of Classification Search
USPC .............................................................. 173/9
See application file for complete search history.

(56) References Cited

U.S. PATENT DOCUMENTS

| | | | | |
|---|---|---|---|---|
| 4,586,859 A * | 5/1986 | Rohm | .................... | B23B 31/123 279/116 |
| 4,607,855 A * | 8/1986 | Rohm | .................... | B23B 31/001 279/140 |
| 4,619,461 A * | 10/1986 | Rohm | .................... | B23B 31/123 173/48 |
| 4,787,278 A * | 11/1988 | Bononi | .................... | B25B 13/06 279/102 |
| 4,818,157 A * | 4/1989 | Kouvelis | ............... | B23B 31/005 279/145 |
| 4,850,758 A * | 7/1989 | Morgan | ................ | B23B 31/005 279/128 |
| 5,129,118 A * | 7/1992 | Walmesley | ............... | B25F 3/00 279/145 |
| 5,191,666 A * | 3/1993 | Corbin | .................. | B25B 21/007 279/145 |
| 5,481,949 A * | 1/1996 | Yen | ..................... | B25B 23/0035 279/24 |
| 5,531,549 A * | 7/1996 | Fossella | ................ | B23B 31/123 279/140 |
| 5,951,026 A * | 9/1999 | Harman, Jr. | ............. | B23Q 3/12 279/143 |
| 6,000,888 A * | 12/1999 | Hartman | ............. | B23B 31/1071 173/59 |
| 6,511,268 B1* | 1/2003 | Vasudeva | ............ | B23B 31/1071 279/14 |
| 6,550,786 B2* | 4/2003 | Gifford | .................... | B23Q 3/12 279/143 |
| 6,551,037 B2* | 4/2003 | Gifford | .................... | B23Q 3/12 279/145 |
| 6,688,611 B2* | 2/2004 | Gifford | .................... | B23Q 3/12 279/143 |
| 7,331,738 B2* | 2/2008 | Hofbrucker | ........... | B25B 21/007 279/145 |
| 7,722,300 B1* | 5/2010 | Corcoran | ............ | B23B 31/1238 279/62 |
| 7,824,136 B2* | 11/2010 | Campbell | ............... | B25F 5/021 279/157 |
| 8,132,990 B2* | 3/2012 | Bauman | ................ | B23B 31/008 279/137 |
| 8,622,667 B1* | 1/2014 | Seay | ....................... | B23B 51/12 279/14 |
| 8,695,725 B2* | 4/2014 | Lau | ........................... | B25F 3/00 173/170 |
| 8,844,939 B2* | 9/2014 | Woecht | .................... | B25F 3/00 279/140 |
| 9,415,488 B2* | 8/2016 | Puzio | ....................... | B25B 21/02 |
| 9,776,315 B2* | 10/2017 | Cannaliato | ............... | B25F 3/00 |
| 2004/0021276 A1* | 2/2004 | Allan | ................... | B23B 31/1173 279/103 |
| 2009/0026718 A1* | 1/2009 | Krondorfer | ......... | B23B 31/1071 279/30 |
| 2010/0282485 A1* | 11/2010 | Puzio | .................. | B23B 31/1074 173/217 |
| 2010/0301569 A1* | 12/2010 | Rohr, Jr. | ............... | B23B 31/201 279/102 |
| 2011/0089218 A1* | 4/2011 | Santamarina | ........... | B23B 51/08 227/139 |
| 2011/0127054 A1* | 6/2011 | Chen | ................... | B23B 31/1071 173/114 |
| 2014/0346744 A1* | 11/2014 | Herr | ......................... | B25F 3/00 279/144 |

FOREIGN PATENT DOCUMENTS

| | | |
|---|---|---|
| DE | 10 2007 036312 | 2/2009 |
| DE | 10 2007 048 822 | 4/2009 |
| EP | 1 236 538 | 9/2002 |
| EP | 1 795 307 | 6/2007 |
| GB | 2 381 225 | 4/2003 |

* cited by examiner

400

HAND-HELD MACHINE TOOL HAVING A STRIKING MECHANISM

BACKGROUND OF THE INVENTION

1. Field of the Invention

The present invention relates to an hand-held machine tool having a tool holder, for holding at least one first tool, which has a tang provided with a first connecting contour, that is able to be connected torsionally fixed to the tool holder, and having a striking mechanism for the striking drive of the first tool connected to the tool holder in the axial direction of the tool holder in a striking operation assigned to the hand-held machine tool.

2. Description of the Related Art

Published German patent application document DE 10 2007 048 822 A1 describes such an hand-held machine tool, in which the tool holder is developed both to accommodate a so-called SDS Quick mini-boring tool and to accommodate a so-called HEX drill or a screwdriver bit. SDS Quick mini drilling tools suitable for this are drilling tools which have an essentially cylindrical tang having two protruding, rotation-catching crosspieces parallel to the longitudinal axis of the tang, which each have a locking recess. Suitable HEX drills and screwdriver bits are tools which have a tang that has a hexagonal cross section, at least in sections, which in the HEX drills are provided with an annular groove. Any tool situated in the tool holder is able to be driven in a hammering or striking manner, via a hammer striking mechanism assigned to the hand-held machine tool, having a striking pin or riveting die.

The disadvantage in the related art is that the tool holder of this hand-held machine tool is developed exclusively for holding tools having coupling contours of the SDS-Quick type or the HEX type, but is not suitable for holding tools whose coupling contour is, for example, of the round tang type, that is, that have a tang having a purely circular cross section.

BRIEF SUMMARY OF THE INVENTION

It is therefore one object of the present invention to provide a new hand-held machine tool which is able to be used having a plurality of different tools having various types of coupling contours.

The object is attained by an hand-held machine tool having a tool holder, for holding at least one first tool, which has a tang provided with a first connecting contour, that is able to be connected torsionally fixed to the tool holder, and having a striking mechanism for the striking drive of the first tool connected to the tool holder in the axial direction of the tool holder in a striking operation assigned to the hand-held machine tool. A chuck adapter that is able to be connected in a torsionally fixed manner to the tool holder is provided for holding at least one second tool, which has a tang provided with a second coupling contour, which is able to be connected to the chuck adapter in a torsionally fixed manner.

Thus, the present invention makes possible providing a hand-held machine tool that is able to be used with different tools having a plurality of different coupling contours, by using a simple and cost-effective tool adapter.

The first tool is preferably developed for impact drilling or screwing and the second tool for drilling.

Consequently, a universally usable hand-held machine tool may be provided in a simple manner.

The tang of the first tool preferably has a circular cross section, having at least two diametrically opposite, radial enlargements, or a many-sided cross section, and the tang of the second tool preferably has a circular cross section. The first tool is preferably an SDS mini tool or a HEX tool. The second tool is preferably a round tang drill.

Thus the present invention makes possible using the hand-held machine tool with several customary types of tools, by using a cost-effective and reliable chuck adapter.

The tool holder preferably has a spring-loaded locking sleeve for locking the first tool in the tool holder.

Thus the first tool may be locked in the tool holder in a simple manner.

According to one specific embodiment, the chuck adapter has a locking tang provided with the first coupling contour for the torsionally fixed connection to the tool holder.

Thus, the present invention makes possible a stable and secure rotary locking of the chuck adapter by the tool holder.

The chuck adapter preferably has an actuating sleeve for locking the locking tang in the tool holder, which is developed for actuating the spring-loaded locking sleeve.

Thus the locking tang of the chuck adapter may be locked in the tool holder in a simple manner.

The actuating sleeve preferably has a locking member for unlocking the tool holder by locking the spring-loaded locking sleeve in the axial direction.

Thus, a secure and reliable operation of the locking sleeve may be ensured.

According to one specific embodiment, the actuating sleeve is connected to a restoring spring, which acts on the actuating sleeve axially, in the direction of the chuck adapter, the actuating sleeve being displaceable for actuating the spring-loaded locking sleeve against a restoring force provided by the restoring spring, axially, in the direction of the locking sleeve.

Thus, the present invention makes possible providing a simple and rapidly operable actuating sleeve, which is acted upon by the restoring spring, in each case in the direction of an associated starting position.

According to a further specific embodiment, the actuating sleeve for actuating the spring-loaded locking sleeve is rotatable about the longitudinal axis associated with the chuck adapter.

Thus the present invention makes possible providing a cost-effective actuating sleeve.

The striking mechanism is preferably a hammer striking mechanism. The striking mechanism preferably has a striking pin that is developed to drive the first tool or the chuck adapter in a striking manner.

Thus, a striking or hammering drive of the first tool or of the chuck adapter may be implemented in a simple manner.

According to one specific embodiment, the hand-held machine tool is developed like a hammer drill having a screwdriver function. According to one further specific embodiment, the hand-held machine tool is developed like a cordless screwdriver having a hammer striking mechanism.

Thus, the present invention may be used for a plurality of differently developed hand-held machine tools.

The problem mentioned at the outset is also solved by a hand-held machine tool having a tool holder for accommodating at least one first tool and having a hammer striking mechanism for the striking drive of the first tool connected to the tool holder. The tool holder preferably has associated with it a spring-loaded locking element for locking the first tool in the tool holder. A chuck adapter that is able to be connected to the tool holder in a torsionally fixed manner is provided to accommodate at least one second tool, which is associated with an actuating element for actuating the locking element in response to a connection of the chuck adapter to the tool holder.

In addition, the object named at the outset is attained by a chuck adapter for an hand-held machine tool having a tool holder, for holding at least one first tool, which has a tang provided with a first coupling contour, that is able to be connected torsionally fixed to the tool holder, and having a striking mechanism for the striking drive of the first tool connected to the tool holder in the axial direction of the tool holder in a striking operation assigned to the hand-held machine tool. The chuck adapter that is able to be connected in a torsionally fixed manner to the tool holder, and is provided for accommodating at least one second tool, which has a tang provided with a second coupling contour, that is able to be connected to the chuck adapter in a torsionally fixed manner.

DETAILED DESCRIPTION OF THE INVENTION

Figure 1:
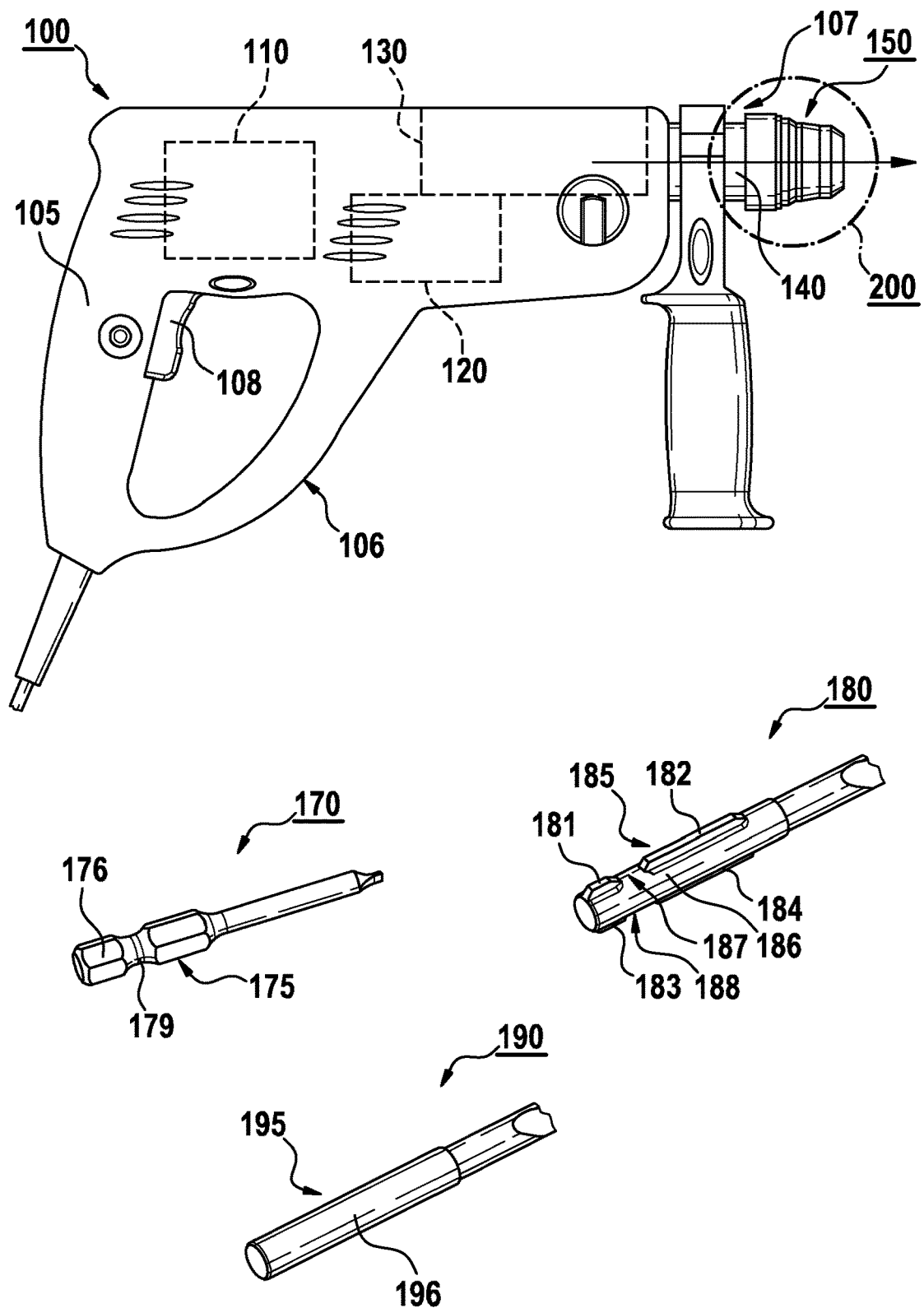
FIG. 1 shows a schematic view of an hand-held machine tool having a tool holder and exemplary tools according to one specific embodiment.

FIG. 1 shows an hand-held machine tool 100, which is developed, according to a first specific embodiment, along the lines of a hammer drill having a screwdriver function, which illustratively is able to be operated in a network-dependent manner. Hand-held machine tool 100 has a housing 106, in which a drive unit developed by an electric motor 110 is provided. The latter is able to be switched on and off via a switch 108 provided on a handle 105, and is used to generate a torque that is transmitted via a transmitting device 120 to a striking mechanism 130, particularly a pneumatic striking mechanism and/or a hammer striking mechanism and/or to a drive means formed by a hammer tube 140 that rotates in the operation of hand-held machine tool 100, which is situated at distal end 107 of hand-held machine tool 100. On hammer tube 140, a tool holder 150 is illustratively provided.

Tool holder 150 is developed for accommodating at least one first tool, which has a tang that is able to be connected to tool holder 150 in a torsionally fixed manner. Tool holder 150 is illustratively able to be connected to a tool 170, which has a tang 176 having a coupling contour 175, which is formed by a many-sided, particularly an octagonal cross section of tang 176 and an annular groove 179 provided on it. In addition, tool holder 150 is able to be connected to a tool 180, which has a tang 186 having a coupling contour 185, which is formed by a circular cross section of tang 186 having at least two diametrically opposite, radial enlargements 181, 182 and 183, 184 respectively, having associated locking recesses 187, 188.

According to one specific embodiment, tool holder 150 is developed in the manner of an SDS Quick tool holder, tool 170 illustratively being a screwdriver bit of the HEX type, alternatively also able to be developed as a HEX drill, for example, and tool 180 illustratively is a hammer drill of the SDS Quick type. Hand-held machine tool 100 may thus be used while using tool 170 for screwing and while using tool 180 for drilling or impact drilling. It should be pointed out, however, that the present invention is not limited to SDS Quick tool holders, but may quite generally be used for SDS Quick and SDS Plus tool holders and/or bit tool holders. Therefore, to simplify the following description, we shall only refer to "SDS tool holders" or "SDS Mini tools, with respect to SDS Quick and SDS Plus tool holders and mini-tools.

In addition, the present invention is not restricted to network-dependently operable hammer drills, but may be used for a number of electric tools which are provided with an SDS or a bit tool holder, independently of whether these electric tools are designed to be network-dependent or cordless. Hand-held machine tool 100, according to one specific embodiment for example, may be developed like a cordless screwdriver having an integrated hammer striking mechanism. The method of functioning and the design of a suitable hand-held machine tool, as well as of a suitable SDS or bit tool holder are sufficiently known from the related art so that, at this place, a detailed description may be omitted for the purpose of conciseness in the description.

According to another specific embodiment, a chuck adapter (300 in FIG. 3 or 700 in FIG. 7) that is able to be connected to tool holder 150 is provided, in order to enable using at least one second tool with hand-held machine tool 100, which is not able to be connected to tool holder 150 in a torsionally fixed manner. A tool 190 that is illustratively developed as a round tang drill, for instance, that has a coupling contour 195, which is formed by a circular cross section of tang 196, is not able to be connected to tool holder 150 in a torsionally fixed manner.

Figure 2:
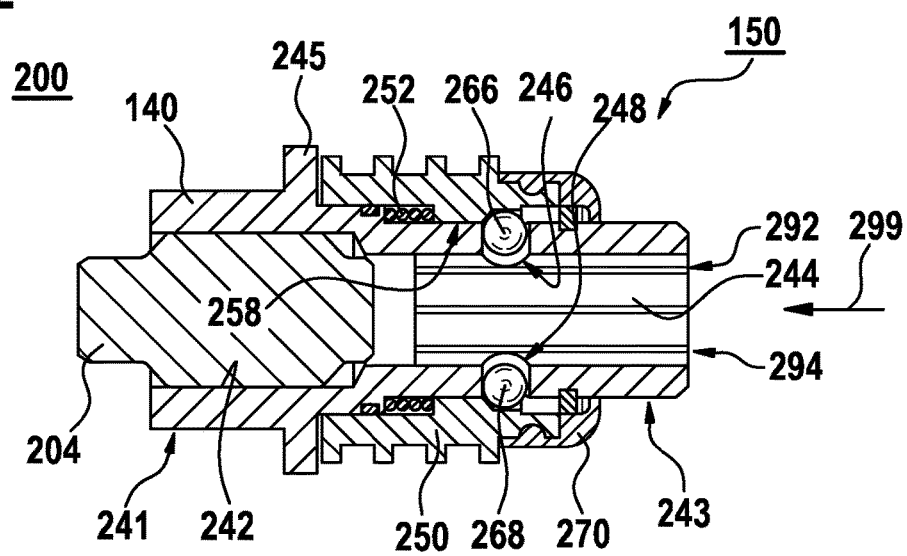
FIG. 2 shows a sectional view of a cutout of the hand-held machine tool, having the tool holder of FIG. 1.

FIG. 2 shows an enlarged sectional view of a cutout 200 of FIG. 1, which illustrates hammer tube 140 having exemplary tool holder 150 situated on it. At proximal end 241 of hammer tube 140 provided with an outer, annular flange 245 an inner cavity 242 is developed in which a striking pin or riveting die 204 is situated axially movably, and which tapers to form an inside accommodation 244 provided at distal end 243 of hammer tube 140, illustratively an SDS inside accommodation 244 having an octagonal profile. This has lateral guide grooves 292, 294 and is used to accommodate tool 170 or 180 of FIG. 1, which is pushed into inside accommodation 244 for this purpose, in the direction of arrow 299.

In order to lock tool 170, 180 of FIG. 1 in inside accommodation 244, at hammer tube 140 in the area of inside accommodation 244, two radial openings 246, 248, in which locking balls 266 and 268 respectively are situated These are shown in FIG. 2 in an associated unlocking position. In addition, in the area of inside accommodation 244, a locking sleeve 250 is situated, which is supported in an axially displaceable manner at the outer circumference of hammer tube 140, and has an inner circular collar 258. Between this inner circular collar 258 and hammer tube 140 a pressure spring 252 is provided which acts upon locking sleeve 250 in the direction of an associated locking position. To seal tool holder 150, a sleeve-shaped sealing element 270 is provided particularly to protect the latter against the entering of dirt and dust in the operation of hand-held machine tool 100 of FIG. 1, and thus to prevent impairing its functionality.

When fastening tool 170 or 180 of FIG. 1 in tool holder 150, locking sleeve 250 is axially displaced in the direction of an arrow 299, against the force of pressure spring 252, until sleeve 250 is blocked by flange 245, and thus the unlocking position shown has been reached. In this connection, annular collar 258 releases locking balls 266, 268, which are thus able to be pressed radially outwards by tool 170 or 180 of FIG. 1 into inside accommodation 244 when the tool is pushed in. Then locking sleeve 250 is released, and is thus pushed by pressure spring 252 against the direction of arrow 299, axially into the locking position, annular collar 258 pressing locking balls 266, 268 radially inwards and fixing them. In the operation of hand-held machine tool 100 of FIG. 1 there then takes place a rotational locking of tool 170 or 180 of FIG. 1 by inside accommodation 244, upon which striking pin 204 is able to drive tool 170 or 180 in a striking or hammering manner by strikes in the axial direction counter to the direction of arrow 299. such a striking or hammering drive is sufficiently known from the related art so that, at this place, a detailed description may be omitted for the purpose of conciseness in the description.

Figure 3:
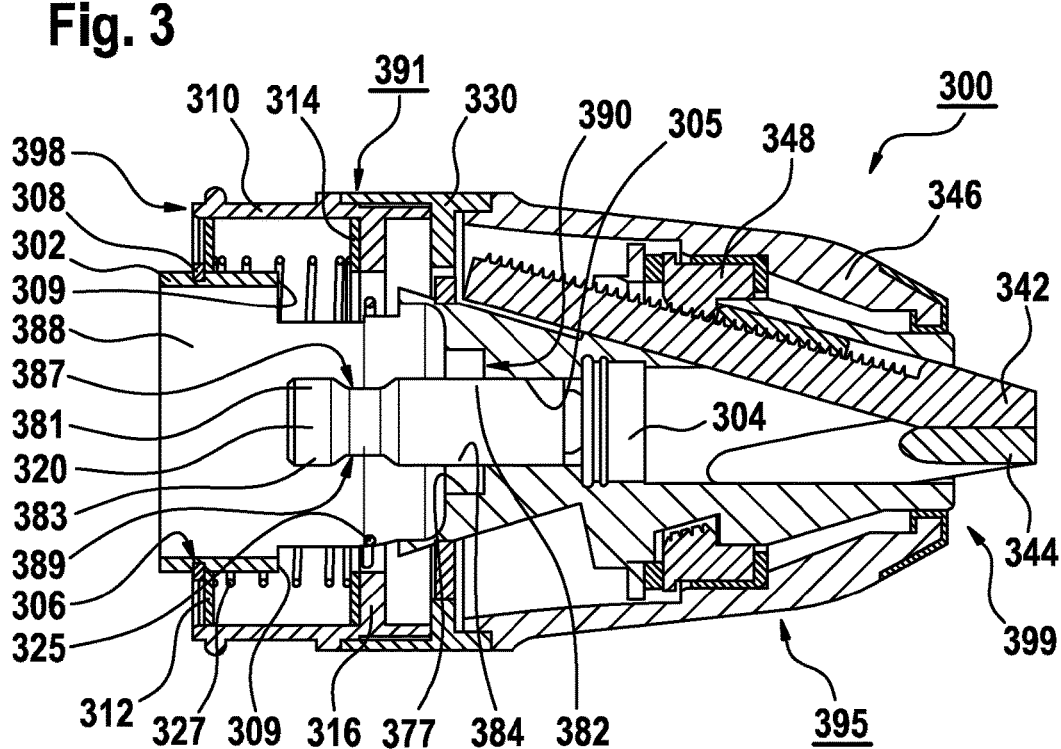
FIG. 3 shows sectional view of a chuck adapter according to a first specific embodiment, that is able to be connected to the tool holder of FIG. 2 by actuating an axially displaceable actuating sleeve.

FIG. 3 shows an exemplary first specific embodiment of a chuck adapter 300, for use with tool holder 150 of FIGS. 1 and 2, which illustratively, in its proximal end region 398, has an adapter section 391 for fastening to tool holder 150 in a torsionally fixed manner. In its distal end region 399, a chuck adapter section 395, connected to adapter section 391 via a supporting body 302, is provided for the torsionally fixed accommodation of tool 190 of FIG. 1.

On supporting body 302, illustratively a specified number of holding fixtures 342, 344, for instance, three or four, are situated for the torsionally fixed clamping of tool 190 of FIG. 1, as well as a clamping sleeve 346, which essentially jackets chuck adapter section 395. Clamping sleeve 346 is used for actuating a clamping device 348, which is able to clamp holding fixtures 342, 344 against tool 190, which is situated between them. It should be mentioned, however, that the design and the functionality of a suitable chuck are sufficiently known from the related art so that, at this place, a detailed description may be omitted for the purpose of conciseness in the description.

Supporting body 302 has a cylindrical recess 305 which, at one axial end, is provided with a fastening device 304, and at the other axial end has a collar-like enlargement 390. In cylindrical recess 305 a locking tang 320, associated with adapter section 391 is situated, which is fastened to fastening device 304 or, for example, is developed as one piece with supporting body 302 or is formed on to it, and protrudes, at least in sections, into an internal space 388 formed by supporting body 302. With collar-like enlargement 390, locking tang 320 forms an annular groove 377 and is developed for the torsionally fixed support in inside accommodation 244 of tool holder 150 of FIG. 2. Accordingly, locking tang 320 has an appropriately annular cross section having radial enlargements 381, 382, 383, 384 and locking recesses 387, 389, that is, locking tang 320 is illustratively developed like tang 186 of tool 180 of FIG. 1.

According to the specific embodiment, supporting body 302, in the area of adapter section 391, has at least one window-like recess 309, in which a locking member 325 is situated axially displaceable, at least in sections. Two diametrically opposite recesses 309 are preferably provided, as shown in FIG. 3.

Locking member 325 is fixed, using a first retainer ring 314, to an inner annular flange 316, which is developed on an actuating sleeve 310 that is supported axially displaceably on supporting body 302, as is described below, in connection with FIG. 5. Between first retainer ring 314 and second retainer ring 312, a restoring spring 327 is situated that is developed as a pressure spring. In this connection, second retainer ring 312 is blocked in an axial end position by restoring spring 327, for instance, by a guard ring 308, which is situated in an outer annular groove 306 provided on supporting body 302 at proximal end 398 of chuck adapter 300, so that restoring spring 327 acts upon retainer ring 314, and consequently actuating sleeve 310 with a specified restoring force in the direction of chuck section 395.

Between actuating sleeve 310 and clamping sleeve 346, a cover sleeve 330 is situated as a visual screen and for protection of adapter section 391 from dirt and dust. This is preferably fastened axially immovably and torsionally fixed on supporting body 302.

Figure 4:
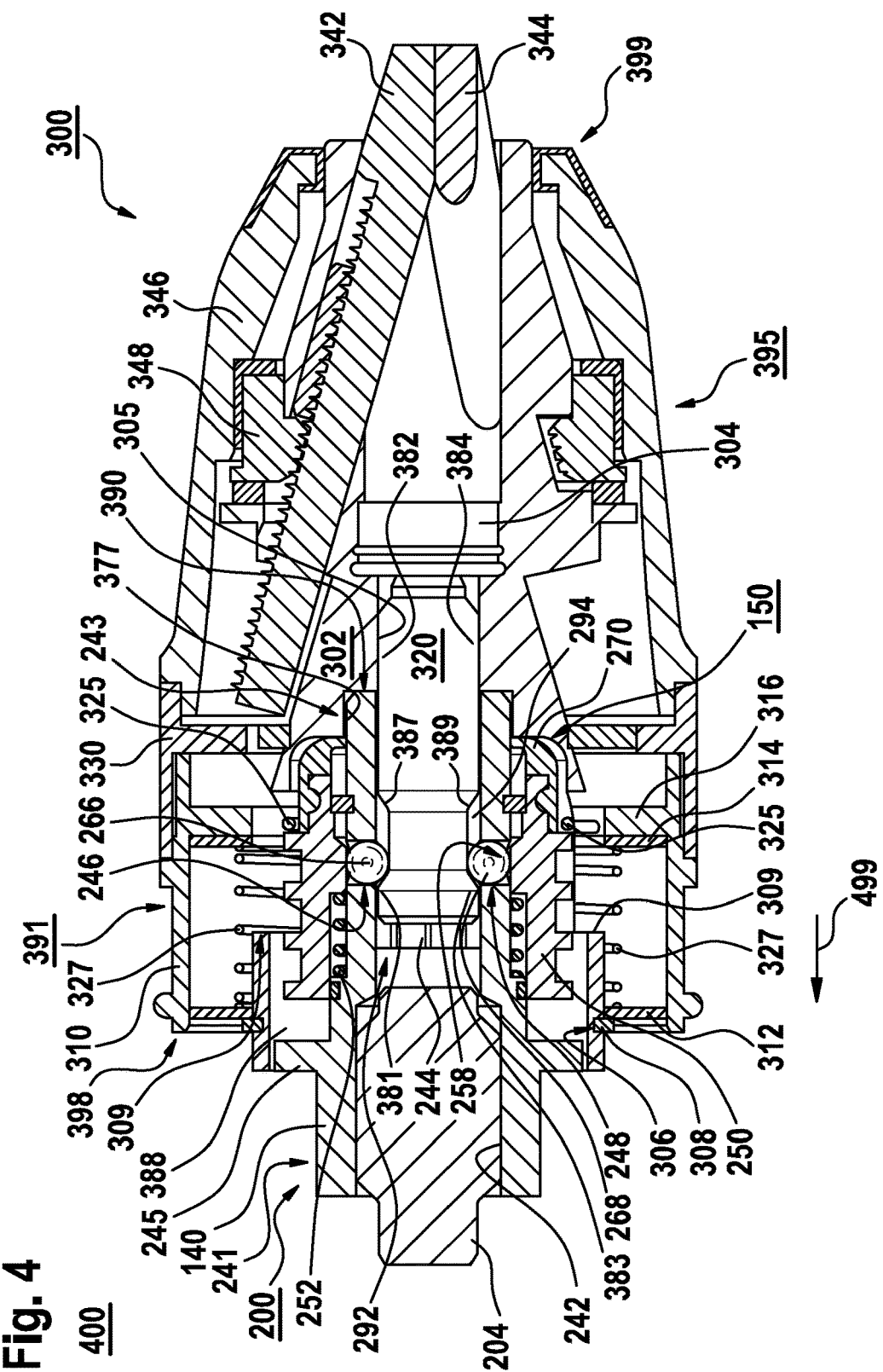
FIG. 4 shows sectional view of the chuck adapter of FIG. 3 connected to the tool holder of FIG. 2.

FIG. 4 shows a configuration 400 having chuck adapter 300 of FIG. 3 connected to system 200 of FIG. 2. It is illustratively supported torsionally fixed, but axially displaceable on tool holder 150 of FIGS. 1 and 2, as described below.

To connect chuck adapter 300 to tool holder 150, the former is pushed onto tool holder 150 with its proximal end region 398 in the direction of an arrow 499 in such a way that locking tang 320 engages with inside accommodation 244, and supporting body 302 encompasses locking sleeve 250 and sealing sleeve 270. In this context, radial enlargements 381, 382, 383, 384 of locking tang 320 are guided in guidance grooves 292 and 294 of inside accommodation 244. Since locking sleeve 250 is first retained by pressure spring 252 in its locking position shown in FIG. 4, locking balls 266, 268 are blocked by annular collar 258 radially inwards, and thus prevent the complete pushing in of locking tang 320 into inside accommodation 244, by blocking radial enlargements 381 and 383.

By actuating sleeve 310, i.e. by an axial displacement or pulling actuating sleeve 310 in the direction of arrow 499, it is moved, at least in sections, against the force of restoring spring 327, out of cover sleeve 330, and locking member 325 is displaced in the window-like recesses 309 of supporting body 302 in the direction of arrow 499. When this is done, locking member 325 presses against locking sleeve 250 and thus effects an axial displacement of locking sleeve 250 against the force of pressure spring 252 in the direction of arrow 499, until locking sleeve 250 reaches the unlocking position shown in FIG. 2, and releases locking balls 266, 268.

Since supporting body 302 is thereby acted upon by restoring spring 327 using a force exerted by it against second retainer ring 312, in the direction of arrow 499, supporting body 302 is now able to be displaced by this force, axially in the direction of arrow 499, whereupon radial enlargements 381, 383 of locking tang 320 displace released locking balls 266 and 268 radially outwards, until these are situated in the vicinity of locking recesses 387 and 389 of locking tang 320.

In response to this axial displacement, supporting body 302 encompasses annular flange 245 provided at proximal end 241 of hammer tube 140, and distal end 243 of hammer tube 140 is pushed into annular groove 377, and is axially blocked there by collar-like enlargement 390.

By the release of actuating sleeve 310, the connection of chuck adapter 300 to tool holder 150 is terminated, whereupon actuating sleeve 310 is moved back into its initial position by the restoring force of restoring spring 327 axially in the direction of chuck section 395 into cover sleeve 330. In this instance, locking member 325 releases locking sleeve 250, so that it is pushed back by pressure spring 252 axially into its locking position, in which annular collar 258 blocks locking balls 266, 268 in locking recesses 387 and 389, respectively, of locking tang 320. Locking tang 320 is consequently blocked axially in inside accommodation 244, illustratively having specified axial play, and radial enlargements 381, 382, 383, 384 that engage with guidance grooves 292, 294 are connected to it in a torsionally fixed manner.

As may be seen in FIG. 4, the connection between chuck adapter 300 and tool holder 150 is developed so that locking tang 320 is locked in inside accommodation 244 in the operation of hand-held machine tool 100 of FIG. 1, and torsional locking of locking tang 320 takes place via inside accommodation 244. Centering of chuck adapter 300 to tool holder 150 takes place, in this instance, on the one hand, by distal end 243 of hammer tube 140 that engages with annular groove 277, and on the other hand by annular-shaped flange 245 that is enclosed by supporting body 302, at proximal end 241 of hammer tube 140, so that in the operation of hand-held machine tool 100 of FIG. 1, improved true running properties of chuck adapter 300 are achieved. It should be pointed out, however, that the centering taking place exclusively via distal end 243 of hammer tube 140 engaging in annular groove 377, or via annular-shaped flange 245 enclosed by supporting body 302 already leads to improved true running properties.

To disassemble the connection between chuck adapter 300 and tool holder 150, locking sleeve 250 is moved into unlocking position by actuating sleeve 310, as was described above. Chuck adapter 300 may then be pulled away from tool holder 150.

Figure 5:
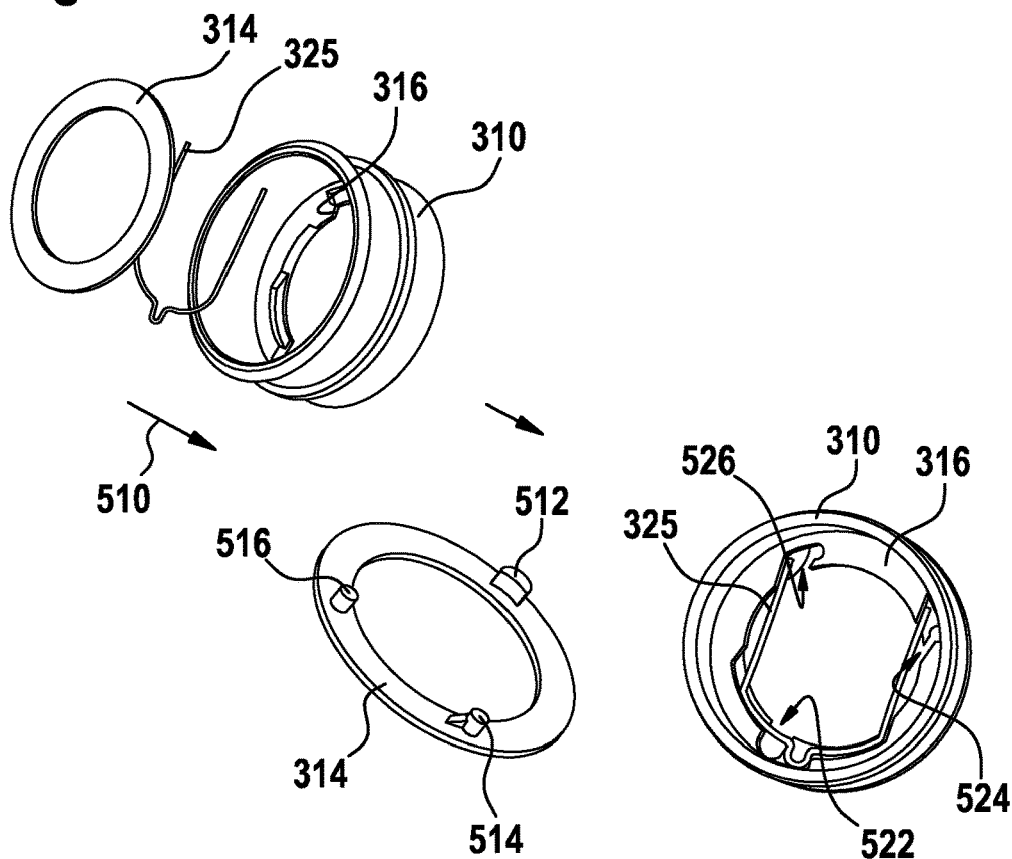
FIG. 5 shows side view of the actuating sleeve of the chuck adapter of FIG. 3, having a locking member according to a first specific embodiment.

FIG. 5 shows first retaining ring 314 and locking member 325 developed, for example, as a U-shaped round wire element during an illustrative assembly on actuating sleeve 310, that is provided with inner annular flange 316, of FIG. 3. For this, first locking member 325 and then first retaining ring 314 are introduced into actuating sleeve 310, in the direction of an arrow 510.

According to one specific embodiment, on annular flange 316 of actuating sleeve 310, recesses 522, 524, 526 combined with openings are provided which, on the one hand, are developed for accommodating locking member 325 and, on the other hand, are developed for accommodating or passing through positioning members 512, 514 and 516. These are illustratively provided on first retaining ring 314, formed on, for example.

But we should point out that the specific embodiment shown of locking member 325 in the nature of a U-shaped round wire element has only an exemplary character, and should not be understood as a restriction to the present invention. Rather, a plurality of different specific embodiments is possible, which are familiar to one skilled in the art, and ensure the required locking functionality of locking member 325. For example, instead of locking member 325 that is shown, two separate flat wire elements may be used. In addition, it is pointed out that the assembly shown only has an illustrative character, in order to make clear an appropriate connection between retaining ring 314, locking member 325 and actuating sleeve 310. To be sure, this assembly ultimately takes place on supporting body 302 of FIG. 3.

Figure 6:
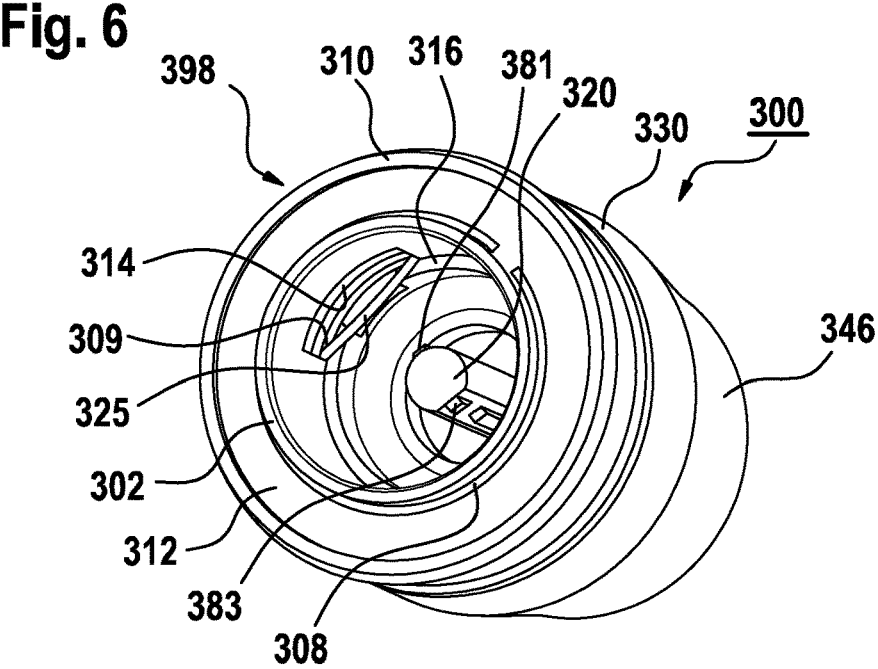
FIG. 6 shows perspective view of a proximal side of the chuck adapter of FIG. 3.

FIG. 6 shows proximal end region 398 of chuck adapter 300 of FIG. 3, and shows clearly security ring 308 that is fastened for blocking second retaining ring 312 on supporting body 302. In addition, FIG. 6 shows clearly window-type recesses 309 provided in supporting body 302, into which locking member 325 that is fixed on annular flange 316 protrudes, as well an exemplary embodiment of locking tang 320.

Figure 7:
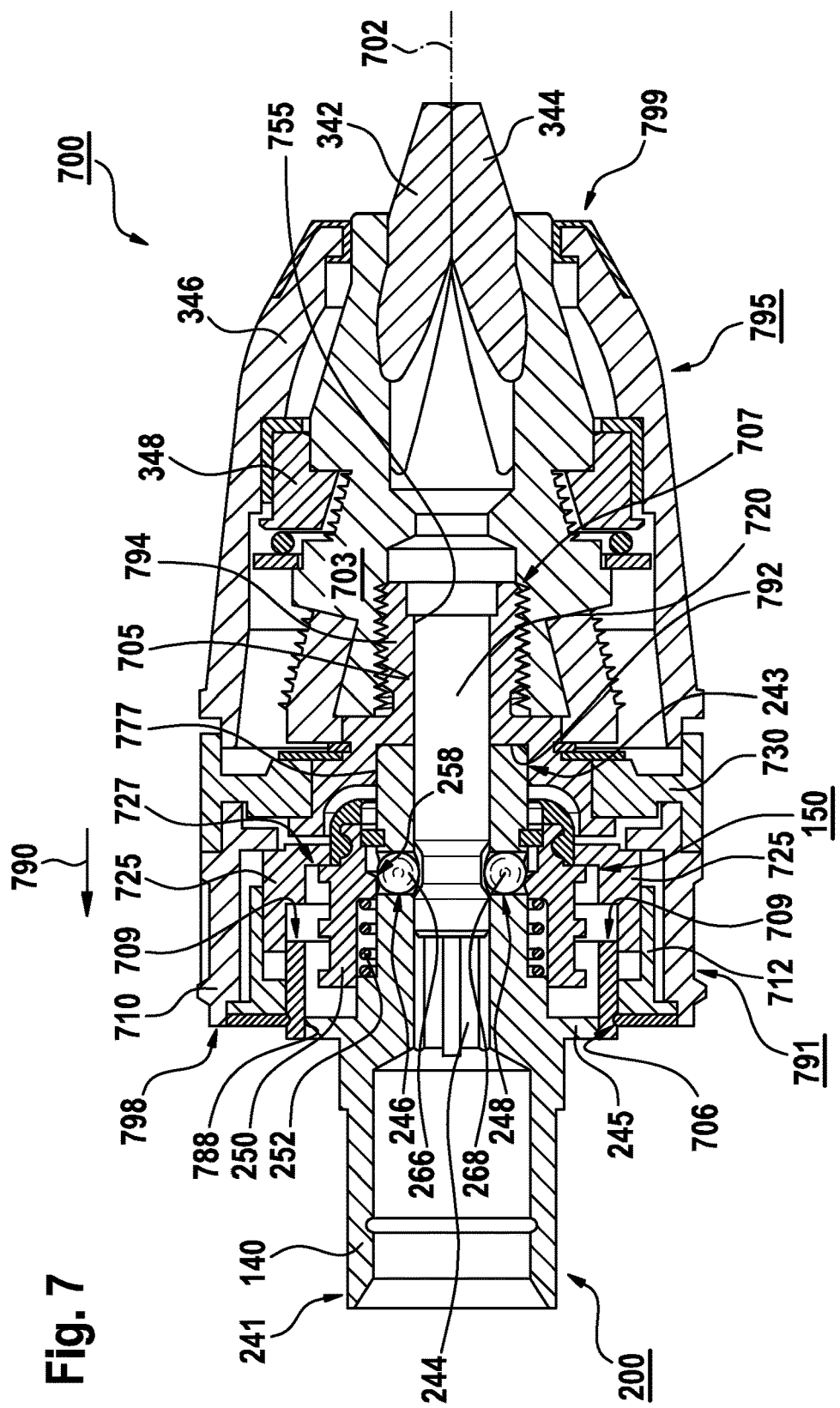
FIG. 7 shows sectional view of a chuck adapter according to a second specific embodiment, that is able to be connected to the tool holder of FIG. 2 by actuating a rotatable actuating sleeve.

FIG. 7 shows an exemplary second specific embodiment of a chuck adapter 700, for use with tool holder 150 of FIGS. 1 and 2, which illustratively, in its proximal end region 798, has an adapter section 791 for fastening to tool holder 150 in a torsionally fixed manner. In its distal end region 799, a chuck section 795, connected to adapter section 791 is provided for the torsionally fixed accommodation of tool 190 of FIG. 1. In contrast to chuck section 395 of FIG. 3, chuck section 795 has a first supporting body 703 having a recess 705, in which a distal end region 707 of a second supporting body 794, associated with adapter section 791, is fastened, for instance, by being pressed in. Otherwise, chuck section 795 essentially corresponds to chuck section 395.

Second supporting body 794 in exemplary fashion has a cylindrical recess 755, which has a collar-like enlargement 792 at an axial end. In cylindrical recess 755, a locking tang 720, is situated torsionally fixed and essentially axially immovable, for instance, pressed in or developed as one piece with supporting body 794 or is formed on to it, and protrudes, at least in sections, into an internal space 788 formed by supporting body 794. With collar-like enlargement 792, locking tang 720 forms an annular groove 777 and is developed for the torsionally fixed support in inside accommodation 244 of tool holder 150 of FIG. 2. For example, locking tang 720, same as locking tang 320 of FIG. 3 is developed so that, in this case, for the purpose of conciseness of the description, a detailed description may be omitted.

According to one specific embodiment, second supporting body 794 has at least one window-like recess 709, in which at least one locking member 725 provided with an inner locking shoulder 727 engages. Preferably, two diametrically opposite recesses 709 are provided, in which two separate locking members 725 engage.

As described in connection with FIG. 8, locking member 725 is supported in an axially displaceable manner on a carrier ring 712, which is fixed in an annular groove 706 provided on supporting body 794 of chuck adapter 700 in a torsionally fixed and axially immovable manner. In addition, an actuating sleeve 710, that encloses locking member 725 and supporting body 794, at least in sections, is supported rotatably, but axially immovably, on carrier ring 712, between sleeve 710 and carrier ring 712 at least one restoring spring (888, 889 in FIG. 8) being situated, as is described below in connection with FIG. 8. Actuating sleeve 710 engages rotatably with a cover sleeve 730 that is preferably fastened, axially immovably and torsionally fixed, to supporting body 794, which is provided as a visual screen and to protect adapter section 791 from dirt and dust, and forms an intermediate member to chuck section 795.

To connect chuck adapter 700 to tool holder 150 of FIG. 2, the former is pushed onto tool holder 150 with its proximal end region 798 in the direction of an arrow 790 in such a way that locking tang 720 engages with inside accommodation 244, and supporting body 794 encompasses locking sleeve 250 and sealing sleeve 270. Since locking sleeve 250 is first retained by pressure spring 252 in its locking position as described above, locking balls 266, 268 are blocked by annular collar 258 radially inwards, and thus prevent the complete pushing in of locking tang 720 into inside accommodation 244, by blocking radial enlargements 381 and 383.

By actuating sleeve 710, i.e. by the radial rotation of actuating sleeve about its longitudinal axis 702 of chuck adapter 700 against the force of restoring spring (888, 889 in FIG. 8), locking member 725 is then displaced axially in the direction of arrow 790 in the window-like recesses 709 of supporting body 794. When this is done, locking shoulder 727 of locking member 725 presses against locking sleeve 250 and thus effects an axial displacement of locking sleeve 250 against the force of pressure spring 252 in the direction of arrow 790, until locking sleeve 250 reaches the unlocking position shown in FIG. 2, and releases locking balls 266, 268. By doing this, supporting body 794 is axially displaced, by a pulling motion, in the direction of arrow 790, until supporting body 794 encloses annular-shaped flange 245, that is provided at proximal end 241 of hammer tube 140, whereupon locking tang 720 is pushed completely into inside accommodation 244, and hammer tube 140 engages at its distal end 243 with annular groove 777 and is axially blocked there by collar-like enlargement 792.

Figure 8:
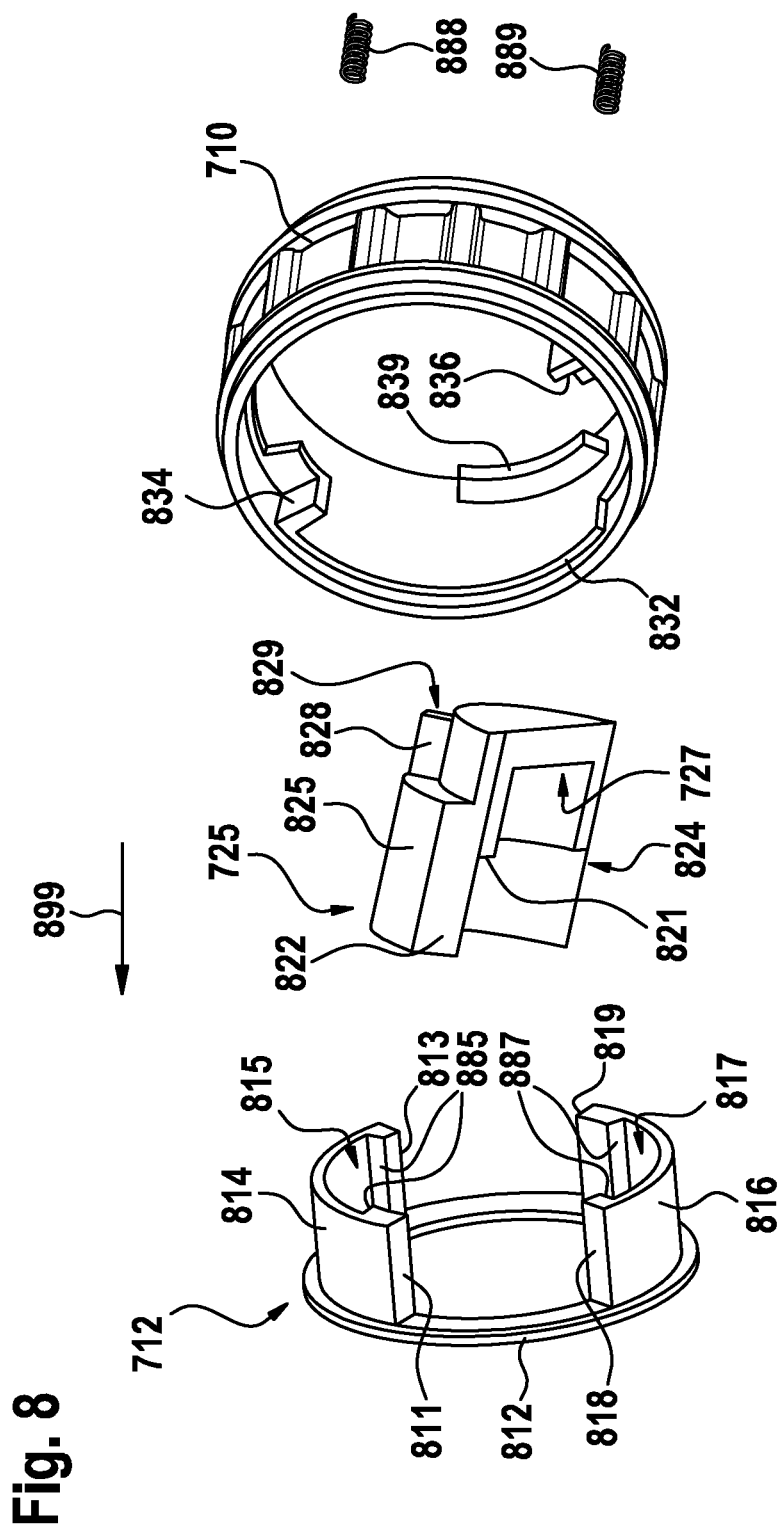
FIG. 8 shows side view of the actuating sleeve of the chuck adapter of FIG. 7, having a locking member according to a second specific embodiment.

By the release of actuating sleeve 710, the connection of chuck adapter 700 to tool holder 150 is terminated, whereupon actuating sleeve 710 is rotated about longitudinal axis 702 back into its initial position by the restoring force of restoring spring (888, 889 in FIG. 8). In this instance, locking member 725 releases locking sleeve 250, so that it is pushed back by pressure spring 252 axially into its locking position, in which annular collar 258 blocks locking balls 266, 268 as described in connection with FIG. 4, in their position aligned radially inwards. Locking tang 720 is thus blocked illustratively having specified axial play and torsionally fixed in inside accommodation 244.

As may be seen in FIG. 7, the connection between chuck adapter 700 and tool holder 150 is developed so that locking tang 720 is locked in inside accommodation 244 in the operation of hand-held machine tool 100 of FIG. 1, and torsional locking of locking tang 720 takes place via inside accommodation 244. Centering of chuck adapter 700 to tool holder 150 takes place, in this instance, on the one hand, by distal end 243 of hammer tube 140 that engages with annular groove 277, and on the other hand, by annular-shaped flange 245, that is enclosed by supporting body 794, at proximal end 241 of hammer tube 140, so that in the operation of hand-held machine tool 100 of FIG. 1, improved true running properties of chuck adapter 700 are achieved. It should be pointed out, however, that the centering taking place exclusively via distal end 243 of hammer tube 140 engaging in annular groove 777, or via annular-shaped flange 245 enclosed by supporting body 794 already leads to improved true running properties.

To disassemble the connection between chuck adapter 700 and tool holder 150, locking sleeve 250 is moved into the unlocking position by twisting sleeve 710, as was described above. Chuck adapter 700 may then be pulled away from tool holder 150.

FIG. 8 shows carrier ring 712 and locking member 725 of FIG. 7 at an illustrative assembly on actuating sleeve 710 of FIG. 7. carrier ring 712 has, for instance, an annular section 812, on which, in the axial direction, a first retaining section 814 is provided, preferably formed on, having outer wall sections 811, 813, and a second retaining section 816 is provided preferably formed on, having outer wall sections 818, 819, According to one specific embodiment, locking member 725 is first introduced into a recess 815 developed on first retaining section 814 of carrier ring 712, in such a way that locking member 725 is connected to retaining section 814 in a torsionally fixed manner, but whose sidewalls 822, 824 are axially displaceable at boundary walls 885 of recess 815. Actuating sleeve 710 is then pushed on to carrier ring 712, in the direction of arrow 899.

We should like to point out that in FIG. 8, only a single locking member 725 is shown, which is developed illustratively like a circular block 825 having an opening angle of approximately 60°, on which a first internal shoulder 821, inner locking shoulder 727 and outer displacing crosspiece 828 having a displacement surface 829 are provided. As described for FIG. 7, a second locking member 725 is preferably used, which is situated torsionally fixed and axially displaceable in a recess 817 having boundary walls 887 developed on second retaining section 816 of carrier ring 712.

According to one specific embodiment, carrier ring 712 is situated in actuating sleeve 710 in such a way that annular section 812 lies against an annular shoulder 832 provided on the inner circumference of sleeve 710, on which, illustratively, two step-shaped enlargements 834, 836, directed radially inwards, as well as at least one guidance crosspiece 839 are additionally developed. Between enlargement 834 and wall section 813, a first restoring spring 888, developed as a pressure spring, is situated, and between enlargement 836 and wall section 818, a second restoring spring 889, developed as a pressure spring, is situated.

When actuating sleeve 710 is twisted relative to carrier ring 712 and locking members 725, restoring springs 888, 889 are compressed or extended. Displacing crosspiece 828 is thereby moved along guidance crosspiece 839 on its displacement surface 829 and thus, as described for FIG. 7, is axially moved against or by the force of pressure spring 252 of tool holder 150 of FIG. 7.

What is claimed is:

1. A hand-held machine tool, comprising:
   a tool holder;
   at least one first tool having a tang provided with a first coupling contour, wherein the first tool is configured to be inserted into a cavity of the tool holder and selectively connected to the tool holder in a torsionally fixed manner;
   a striking mechanism for a striking drive of the first tool connected to the tool holder in an axial direction of the tool holder in a striking operation associated with the hand-held machine tool;
   a chuck adapter configured to be selectively connected in a torsionally fixed manner to the tool holder; and
   at least one second tool which has a tang provided with a second coupling contour different from the first coupling contour of the first tool, wherein the tang of the second tool is configured to be selectively connected directly to a clamping device of the chuck adapter in a torsionally fixed manner while the chuck adapter is connected to the tool holder,
   wherein the chuck adapter has a locking tang provided with a first coupling contour configured to be inserted into the cavity of the tool holder and torsionally fixed in the cavity of the tool holder, the first coupling contour of the chuck adapter being identical to the first coupling contour of the first tool, wherein the at least one second tool is not connectable to the tool holder in a torsionally fixed manner, the tang of the first tool has one of (i) a circular cross section having at least two diametrically opposite, radial enlargements, or (ii) a many-sided cross section, the tang of the second tool has a circular cross section having no diametrically opposite, radial enlargements, wherein the tool holder has an axially movable spring-loaded locking sleeve for locking the first tool in the tool holder, wherein the chuck adapter has an actuating sleeve for locking the locking tang of the chuck adapter in the tool holder, and wherein the actuating sleeve is configured for the actuation of the spring-loaded locking sleeve of the tool holder.

2. The hand-held machine tool as recited in claim 1, wherein the first tool is configured for one of impact drilling or screwing, and wherein the second tool is configured for drilling.

3. The hand-held machine tool as recited in claim 1, wherein the first tool is one of an SDS-Mini tool or a HEX tool.

4. The hand-held machine tool as recited in claim 1, wherein the second tool is a round tang drill.

5. The hand-held machine tool as recited in claim 1, wherein the actuating sleeve has a locking member for unlocking the tool holder by locking of the spring-loaded locking sleeve in the axial direction.

6. The hand-held machine tool as recited in claim 1, wherein the actuating sleeve is connected to a restoring spring which acts on the actuating sleeve axially, in the direction of the chuck adapter, the actuating sleeve being displaceable for actuating the spring-loaded locking sleeve against a restoring force provided by the restoring spring axially in the direction of the locking sleeve.

7. The hand-held machine tool as recited in claim 1, wherein the actuating sleeve is rotatable about a longitudinal axis associated with the chuck adapter for actuating the spring-loaded locking sleeve.

8. The hand-held machine tool as recited in claim 1, wherein the striking mechanism is a hammer striking mechanism.

9. The hand-held machine tool as recited in claim 8, wherein the striking mechanism has a striking pin configured to strikingly drive one of the first tool or the chuck adapter.

10. The hand-held machine tool as recited in claim 9, wherein the hand-held machine tool is a hammer drill having a screwdriving function.

11. The hand-held machine tool as recited in claim 10, wherein the hand-held machine tool is a cordless screwdriver having an integrated hammer striking mechanism.

12. The hand-held machine tool as recited in claim 1, wherein the chuck adapter has clamping jaws for holding the at least one second tool.

13. A hand-held machine tool, comprising:
at least one first tool;
a tool holder for holding the at least one first tool, wherein the tool holder has a cavity and a locking element for locking the first tool in the cavity of the tool holder;
a hammer striking mechanism for striking drive of the first tool connected to the tool holder;
at least one second tool; and
a chuck adapter having clamping jaws for holding the at least one second tool, wherein the chuck adapter has a locking tang configured to be selectively locked in the cavity of the tool holder in a torsionally fixed manner and an actuating element for actuating the locking element of the tool holder in response to an insertion of the locking tang into the cavity of the tool holder, wherein a tang of the second tool is configured to be selectively connected directly to a clamping device of the chuck adapter in a torsionally fixed manner while the chuck adapter is connected to the tool holder, wherein the at least one second tool is not connectable to the tool holder in a torsionally fixed manner, the tang of the first tool has one of (i) a circular cross section having at least two diametrically opposite, radial enlargements, or (ii) a many-sided cross section, the tang of the second tool has a circular cross section having no diametrically opposite, radial enlargements, wherein the tool holder has an axially movable spring-loaded locking sleeve for locking the first tool in the tool holder, wherein the chuck adapter has an actuating sleeve for locking the locking tang of the chuck adapter in the tool holder, and wherein the actuating sleeve is configured for the actuation of the spring-loaded locking sleeve of the tool holder.

14. The hand-held machine tool as recited in claim 13, wherein the first tool is configured for one of impact drilling or screwing, and wherein the second tool is configured for drilling.

15. The hand-held machine tool as recited in claim 13, wherein:
the tang of the first tool has one of (i) a circular cross section having at least two diametrically opposite, radial enlargements, or (ii) a many-sided cross section; and
the tang of the second tool has a circular cross section.

16. The hand-held machine tool as recited in claim 15, wherein the first tool is one of an SDS-Mini tool or a HEX tool.

17. The hand-held machine tool as recited in claim 15, wherein the second tool is a round tang drill.

18. The hand-held machine tool as recited in claim 15, wherein the tool holder has a spring-loaded locking sleeve for locking the first tool in the tool holder.

19. The hand-held machine tool as recited in claim 18, wherein the chuck adapter has an actuating sleeve for locking the locking tang in the tool holder, and wherein the actuating sleeve is configured for the actuation of the spring-loaded locking sleeve.

20. The hand-held machine tool as recited in claim 19, wherein the actuating sleeve has a locking member for unlocking the tool holder by locking of the spring-loaded locking sleeve in the axial direction.

21. The hand-held machine tool as recited in claim 19, wherein the actuating sleeve is connected to a restoring spring which acts on the actuating sleeve axially, in the direction of the chuck adapter, the actuating sleeve being displaceable for actuating the spring-loaded locking sleeve against a restoring force provided by the restoring spring axially in the direction of the locking sleeve.

22. The hand-held machine tool as recited in claim 19, wherein the actuating sleeve is rotatable about a longitudinal axis associated with the chuck adapter for actuating the spring-loaded locking sleeve.

23. The hand-held machine tool as recited in claim 13, wherein the striking mechanism has a striking pin configured to strikingly drive one of the first tool or the chuck adapter.

24. The hand-held machine tool as recited in claim 23, wherein the hand-held machine tool is a hammer drill having a screwdriving function.

25. The hand-held machine tool as recited in claim 24, wherein the hand-held machine tool is a cordless screwdriver having an integrated hammer striking mechanism.

26. A chuck adapter for a hand-held machine tool having a tool holder for holding at least one first tool which has a tang provided with a first coupling contour, the first tool being configured to be selectively connected to the tool holder in a torsionally fixed manner, the hand-held machine tool being provided with a striking mechanism for striking drive of the first tool connected to the tool holder in the axial direction of the tool holder in a striking operation associated with the hand-held machine tool, the chuck adapter comprising:

means for selectively connecting to the tool holder in a torsionally fixed manner; and means for holding at least one second tool which has a tang provided with a second coupling contour, wherein the at least one second tool is able to be connected to the chuck adapter in a torsionally fixed manner, wherein the tang of the second tool is configured to be selectively connected directly to a clamping device of the chuck adapter in a torsionally fixed manner while the chuck adapter is connected to the tool holder, wherein the at least one second tool is not connectable to the tool holder in a torsionally fixed manner, the tang of the first tool has one of (i) a circular cross section having at least two diametrically opposite, radial enlargements, or (ii) a many-sided cross section, the tang of the second tool has a circular cross section having no diametrically opposite, radial enlargements, wherein the tool holder has an axially movable spring-loaded locking sleeve for locking the first tool in the tool holder, wherein the chuck adapter has an actuating sleeve for locking the locking tang of the chuck adapter in the tool holder, and wherein the actuating sleeve is configured for the actuation of the spring-loaded locking sleeve of the tool holder.

\* \* \* \* \*